Jan. 27, 1959      D. W. NORWOOD      2,870,670
EXPOSURE CALCULATOR FOR FLASH LIGHT PHOTOGRAPHY
Filed March 12, 1953      3 Sheets-Sheet 2
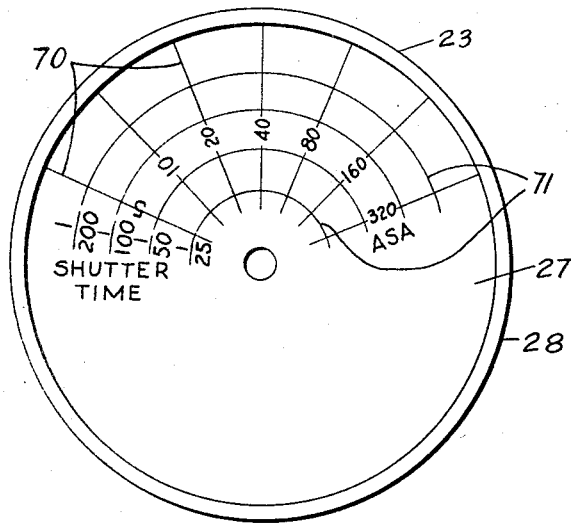
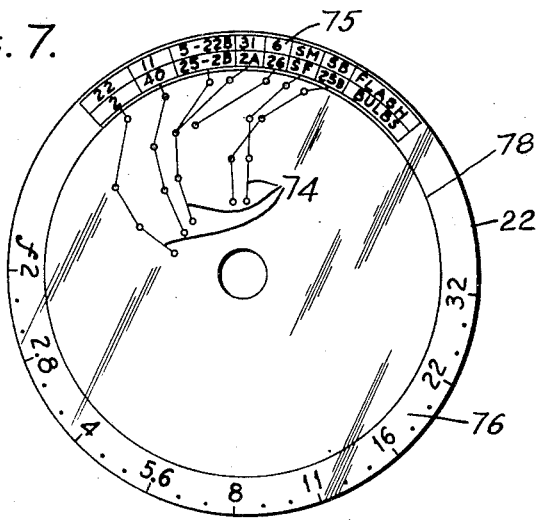
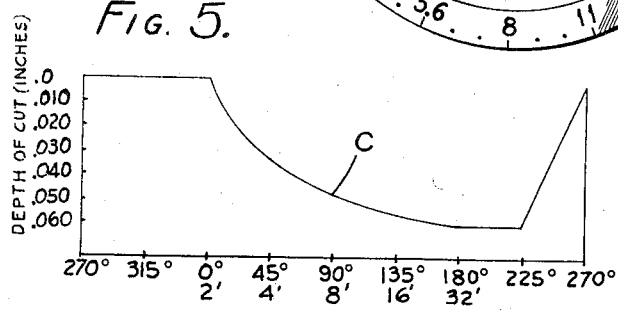
INVENTOR.
DONALD W. NORWOOD
BY
ATTORNEYS.

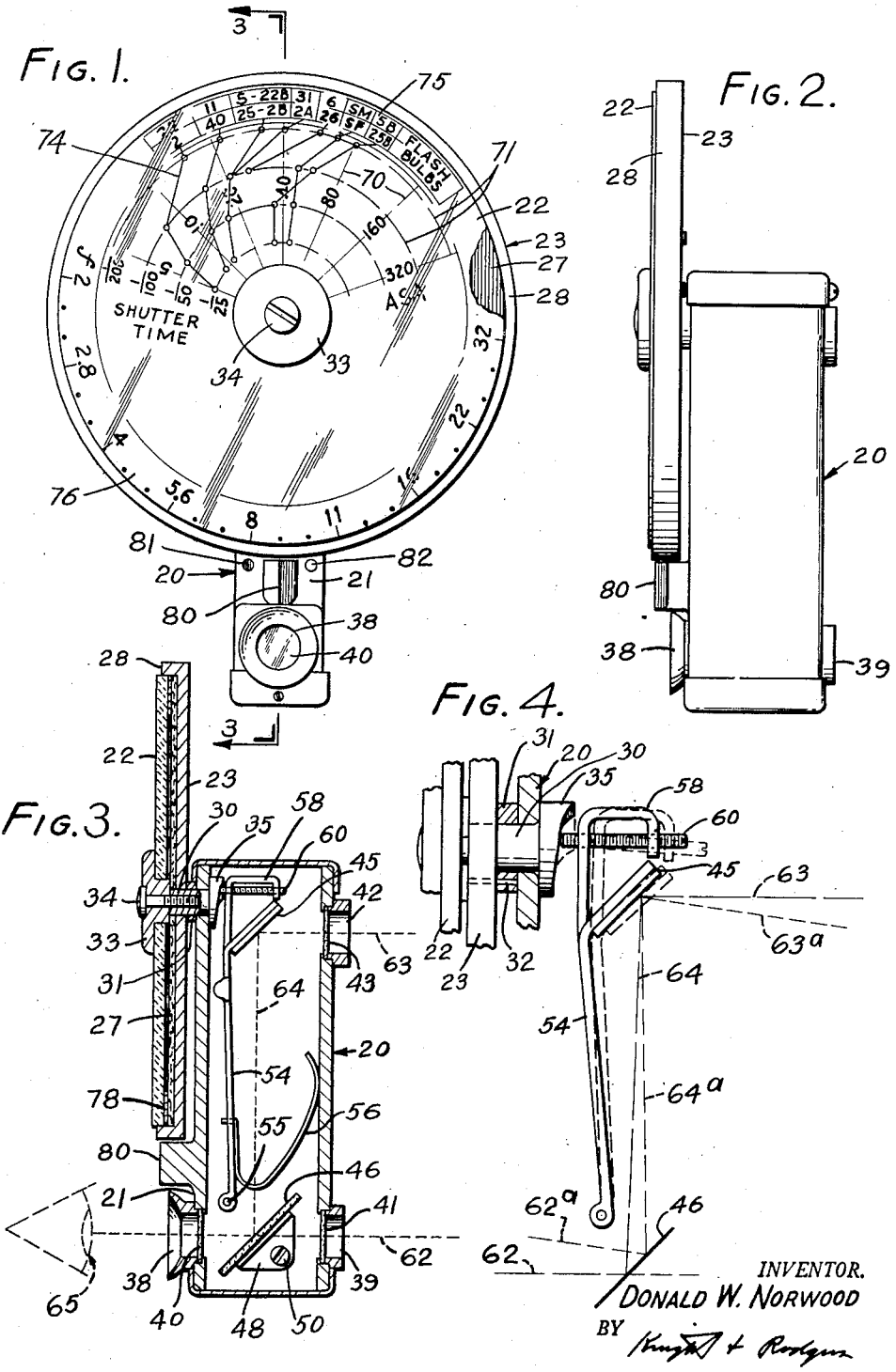

Jan. 27, 1959     D. W. NORWOOD     2,870,670
EXPOSURE CALCULATOR FOR FLASH LIGHT PHOTOGRAPHY
Filed March 12, 1953     3 Sheets-Sheet 3
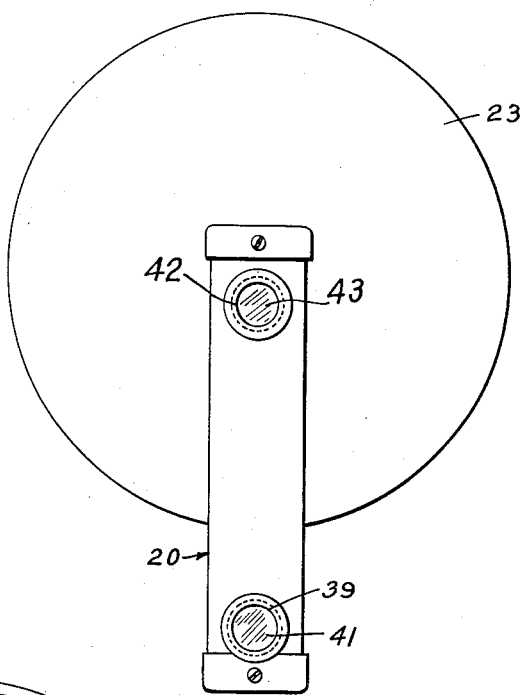
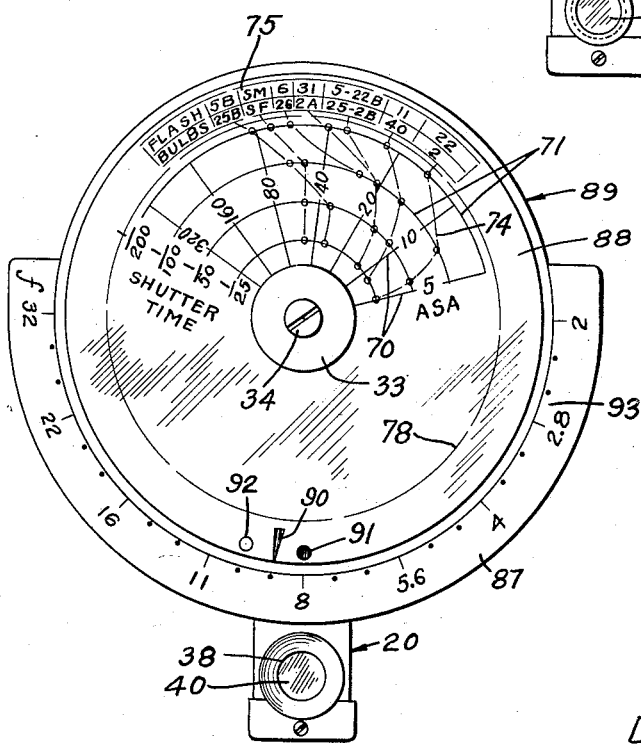
INVENTOR.
DONALD W. NORWOOD
BY
ATTORNEYS.

United States Patent Office 2,870,670
Patented Jan. 27, 1959

2,870,670

EXPOSURE CALCULATOR FOR FLASH LIGHT PHOTOGRAPHY

Donald W. Norwood, Pasadena, Calif.

Application March 12, 1953, Serial No. 341,981

10 Claims. (Cl. 88—2.4)

This invention relates to devices for determining camera adjustments for flash light photography including photography with electronic flash devices and is directed to a compact device for accomplishing this purpose in a simple, convenient and highly dependable manner.

This application is a continuation-in-part of my application Serial No. 282,164, filed April 14, 1952, now abandoned.

The invention takes into consideration five basic factors that enter into problems of correct exposure in flash light photography. These basic factors may be listed as follows:

(1) Effective light developed by the flash. This may be called the flash light or flash factor.

(2) Duration of shutter opening. This duration may be called the shutter time factor.

(3) Speed rating or relative sensitivity of the film. this speed rating may be called the film sensitivity factor.

(4) The size of the camera aperture adjustment relative to the distance from lens to film. This may be called the $f$ stop or aperture factor.

(5) The distance of the light source from the subject being photographed, i. e., the range or distance factor.

Another factor that may be taken into consideration is the degree of reflectivity of the subject and the environment of the subject. This may be termed the reflectivity factor.

In the simplest practice of the invention the shutter time factor and the reflectivity factor are not directly involved in the computing function of the device. This elimination of these two factors for the sake of simplicity is achieved by assuming a shutter adjustment to give an exposure period long enough to include the illumination period of any flash source, say a shutter adjustment of 1/25 second, and by further assuming that the operator will make final correction for the reflectivity factor. With these two factors eliminated, the four factors to be handled by the simplified device of the invention are:

(1) Flash factor
(2) Film sensitivity factor
(3) Aperture factor
(4) Distance factor It is an object of the simplified practice of the invention to solve exposure problems on the basis of these four factors by means of a simple and convenient device. This object is attained by the basic combination of a first scale means, a second scale means adjacent thereto, and a reference means adjacent one of the two scale means, the two scale means being movable relative to each other and relative to the reference means. Preferably, but not necessarily, the two scale means are rotary members. One of the two scale members has a scale representing one of the first two factors of the four factors listed above, and the other of the two scale members has a scale representing the other of the first two mentioned factors, whereby the two scale members may be positioned relative to each other in accord with the first two factors. The combination also includes a range finder mechanism having two relatively movable elements, one of which is operatively connected to one of the two scale members for adjustment thereby to take into account the distance factor and the other of which is connected to the reference means, and cooperating index means on the other of the two scale members and the reference means to take into account the aperture factor. With this arrangement, positioning the two scale members relative to each other in accord with the first two factors and positioning the two scale members relative to the reference means in accord with the distance factor results in cooperation of the reference means with one of the two scale members to indicate the correct camera aperture adjustment.

A feature of the invention is the combination in a single device of the two cooperating scale members and the reference means together with the range finder mechanism operatively connected to one of the scale members for distance-measuring adjustment of a movable range finder element in response to movement of the scale member. An actual distance scale may be included but is not necessary in such an arrangement.

Assuming that the exposure is to be for 1/25 of a second, the procedure for arriving at the correct aperture adjustment of the camera involves two steps. One step, which may be either the first step or the second step is to manipulate the range finder mechanism by movement of the associated scale member operatively connected thereto. The other step is to manipulate the other scale member to bring the selected flash factor into register with the selected film factor. When these two steps are taken the reference means will then cooperate with the other scale member to indicate the aperture adjustment required for correct exposure of the given films to photograph a subject at the given distance from a flash light source of the given character.

The photographer may then make a mental correction for the reflectivity factor. The usual rule is to increase the size of the lens aperture by one-half stop for relatively dark subjects as well as for environments of relatively low reflectivity and to decrease the camera aperture by one-half stop for relatively light subjects as well as for highly reflective environments.

An alternative procedure is to set the two scale members and the range finder mechanism in accord with a pre-selected aperture factor and then while looking at the photographic subject through the range finder, to walk towards or away from the subject to find the distance for which the range finder mechanism is set, which distance is the correct distance for the light source from the subject. A feature of the preferred practice of the invention in this regard is that the two scale members frictionally engage each other with sufficient effectiveness to cause both of the scale members to move synchronously during operation thereof to adjust the range finder mechanism. This feature makes it possible to adjust the two scale members correctly relative to each other before operating the range finder mechanism and then to operate the range finder mechanism with the assurance that the two scale members will be moved synchronously to maintain their preset relationship.

In another practice of the invention the same combination of elements described above is employed for the further function of relieving the operator from the necessity of making a mental correction for the reflectivity factor. It is especially desirable to avoid the necessity of mental computation because of the confusing fact that the "$f$" values or stop numbers vary inversely as the size of the aperture. The photographer has the burden of keeping in mind at all times that a small stop number means the admission into the camera of more light than a large stop number. The invention takes care of the reflectivity factor merely by adding appropriate indicia to the heretofore described combination, no additional structure being necessary. The added indicia may be shaded to represent dark and light subjects or dark and light surroundings.

A more comprehensive practice of the invention provides for directly applying all of the previously listed five basic factors to the computation of exposures and a feature of the invention is that all of these factors, either with or without the reflectivity factor are handled with the same simple structural combination as discussed above. The inclusion of the reflectivity factor without the necessity of additional structure has just been explained. The further inclusion of the shutter factor frees the photographer from the limitation of assuming a shutter adjustment for an exposure of $\frac{1}{25}$ second.

As will be explained, this further development of the invention is made possible by two related concepts. The first concept is the use of two-dimensional scales on the two scale members and the second concept is the use of a first transparent scale member overlying a second scale member for visual guidance in positioning their respective two-dimensional scales relative to each other.

The various features, advantages and potential uses of the invention may be understood from the following detailed description in conjunction with the accompanying drawings.

In the drawings, which are to be considered as merely illustrative:

Fig. 1 is a face view of a selected embodiment of the invention;

Fig. 2 is a side elevation of the same device;

Fig. 3 is a cross-sectional view taken along line 3—3 of Fig. 1;

Fig. 4 is a partly diagrammatic fragmentary view similar to Fig. 3 showing an enlarged detail of the range finder mechanism;

Fig. 5 is a diagram showing graphically the shape of a cam surface used in the operation of the device;

Fig. 6 is a face view of one of the two scale members in the device shown in Fig. 1;

Fig. 7 is a face view of the other of the two scale members;

Fig. 8 is a rear view of the device shown in Fig. 1; and

Fig. 9 is a face view of a second form of the invention.

Figs. 1 to 8 indicate by way of example how the more comprehensive practice of the invention may be embodied in a relatively simple and compact device. In this particular example the relative movement between the two scale means is rotary.

The principal parts of the first embodiment of the invention include: a range finder mechanism enclosed in a suitable housing 20, which serves as a convenient handle for the device; a reference means 21 which is a portion of the range finder housing; a front scale member 22 of transparent material rotatably mounted on the range finder adjacent the reference means; and a back scale member 23 that underlies the front scale member and is rotatably mounted on the range finder housing coaxially of the front scale member. Either one of the two scale members may be operatively connected with the range finder mechanism and preferably the two scale members are in frictional engagement with each other so that when one is rotated to adjust the range finder mechanism the other will rotate synchronously therewith. In this instance it is the back scale member 23 that is operatively connected with the range finder mechanism.

The back scale member 23 may be in the form of a disc with a facing sheet 27 bonded thereto at its forward face, the disc having a circumferential rim flange 28 and being fixedly mounted on a spindle 30. In Fig. 1, the front scale member 22 is partly broken away to show the facing sheet 27 more clearly. In the construction shown the spindle 30 is journaled in the wall of the range finder housing and fixedly carries a collar 31 to which the back scale member 23 is connected by suitable means such as one or more pins 32.

The front scale member 22 is in the form of a transparent disc, preferably made of a suitable plastic, which is journaled for free rotation on a flanged hub member 33. In the construction shown the hub member is mounted on the outer end of the spindle 30 by a suitable screw 34. The spindle 30 may be operatively connected with the range finder mechanism in any suitable manner and for this purpose may be formed with a unitary cam member 35 inside the range finder housing.

The range finder housing 20 has two axially aligned sighting windows 38 and 39 closed by suitable transparent discs 40 and 41 respectively and a third sighting window 42 closed by a third transparent disc 43. The range finder mechanism may be of a familiar type that employs a first movable mirror 45 opposite the sighting window 42 and a second fixed mirror 46 intersecting the common axis of the two windows 38 and 39. The fixed mirror 46 is capable of both reflecting light and transmitting light, the mirror being made of transparent material and having a partially silvered surface for this purpose. In the construction shown the mirror 46 is mounted on a bracket 48 and the bracket, in turn, is mounted on the range finder housing by a suitable screw 50. If necessary the screw 50 may be loosened temporarily for adjusting the angular position of the mirror.

The mirror 45 is carried by an arm 54 that is rotatably mounted on a pivot pin 55 inside the range finder housing. A suitable leaf spring 56 in stress between the arm 54 and the housing continuously urges the arm in a counter-clockwise direction as viewed in Fig. 3. The upper end of the arm 54 is U-shaped as indicated at 58 and carries a suitable adjustment screw 60, the end of which is in cooperating contact with the previously mentioned cam member 35. By virtue of the leaf spring 56 the arm 54 accurately responds to rotation of the cam member 35 and the adjustment screw permits adjustment of the arm relative to the cam member for the purpose of calibrating the range finder. The cam member 35 is shaped to cause clockwise rotation of the arm 54, as indicated by dotted lines in Fig. 4, in response to clockwise rotation of the back scale member 23 and cam 35 as said scale member is viewed in Fig. 1.

The mode of operation of such a range finder mechanism is well known in the art. With the movable parts positioned as shown in Fig. 3 the line of sight or ray of light indicated by the dotted line 62 and the second line of sight or ray of light 63 are nearly parallel since they meet at an object at a relatively great distance from the range finder mechanism. When the mirror 45 is at the angle corresponding to the distance to a particular object, the ray 63 is reflected along the line 64 and again reflected along the line 62 so that the object appears as a single image at the eye position 65. If the movable element 45 of the range finder mechanism is not in adjustment for the particular object represented by the lines 62 and 63 the operator will see two images. For example, if the operator looks at an object closer than the distance adjustment of the movable range finder element 45, the ray of light from the nearer object indicated by the line 63a in Fig. 4 will be reflected along the line 64a and along the line 62a to produce a double image as viewed by the operator.

The back scale member 23 performs a dual function, being both an essential element in the range finder mechanism and an essential element in the computing assembly. In this regard a feature of the invention is the combining of a range finding combination with a computing combination in such manner that one element is omitted without omission of the function of the element. Another dual function is involved since the range finder housing serves as a handle for the computing combination and thus avoids the necessity of providing such a handle.

The rotation of the back scale member 23 is a function of the distance as determined by movement of the range finder element 45 to provide a single image, and preferably the shape of the cam member 35 is such that the distance values represented by rotation of the back scale member 23 vary geometrically, with successively doubled values equally spaced apart. Preferably the distance values double within each 45° of rotation of the back scale member 23.

Fig. 5 shows diagrammatically and numerally how the cam member 35 may be shaped to produce the desired distance scale extending over approximately 180° of rotation of the back scale member 23. The abscissas represent angular movement or position of the cam member in degrees (upper scale) and corresponding range distances in feet (lower scale). The ordinates represent depth of cut of cam surface facing the screw 60. The cam surface, represented by the curve C, recedes most rapidly at the shorter range values, and recedes relatively slightly at the greater range values. It will be noted that between the zero degree point and the 45° point of rotation of the back scale member 23 and cam member 35, the corresponding distance computed by the range finder doubles from 2 feet to 4 feet and doubles successively for each additional 45° of rotation to the final distance value of 32 feet at 180° of rotation of the back scale member.

The forward face of the back scale member 23 in this first embodiment of the invention is provided with a two-dimensional scale in the form of a polar grid scale on the facing sheet 27, having a plurality of angularly spaced radial grid lines 70 and a plurality of radially spaced arcuate grid lines 71, as best shown in Fig. 6. On this scale, radial grid lines 70 represent the film sensitivity factor. They are shown as marked in terms of the conventional A. S. A. ratings of film speed or sensitivity, from 5 to 320 A. S. A. The concentric arcuate grid lines 71 represent values of the shutter time factor and are marked for four speeds from $\frac{1}{25}$ second to $\frac{1}{200}$ second, each successive grid mark reducing the shutter time by half. Since the front scale member 22 is transparent this two dimensional scale for the film sensitivity factor and the shutter time factor is conveniently visible therethrough for guidance in adjusting the two scale members relative to each other.

For cooperation with the described two-dimensional scale on the back scale member 23, the transparent front scale member 22 carries a coacting two-dimensional scale which also involves the shutter time factor. Since the concentric shutter time factor values are the same on both scales and since the two dimensional scale on the back scale member is visible through the front scale member, concentric grid lines corresponding to the concentric grid lines 71 are omitted on the front scale member, but, of course, they may be added if desired. On the front two-dimensional polar scale, as best shown in Fig. 7, a series of lines 74 represent the flash factor as limited or modified by the shutter time factor. Each of these lines corresponding to a modified flash factor represents a flash light source of a given character as may be understood by inspecting the marginal series of numbers 75 marked on scale member 22 and identifying various flash bulbs. It will be noted that the modified flash factor lines 74 are of broken or curved configuration and in nearly all instances change direction between successive points of intersection with the concentric shutter factor grid lines 71. It is to be noted, moreover, that in each instance the change in direction is towards radial alignment with respect to the axis of rotation of the scale member rather than away from such radial alignment, and some of the lines actually terminate in such radial alignment.

The significance of the modified flash factor lines 74 with respect to their distribution and changes in direction may be understood by considering the characteristics of different flash sources. Each line represents the relationship between the shutter time, plotted radially, and the effective illumination value of the corresponding flash light source, that is, the total illumination produced by the flash source during the different shutter time intervals, plotted circumferentially. Some flash sources start very rapidly. Others start slowly but later rise rapidly to a peak of intensity and then fall off rapidly. Some have a relatively flat illumination-level curve over a relatively long period. Some have an extremely short period of very intense illumination. As shown by the tabulation of numbers 75 in Fig. 7 the commonly used flash light bulbs fall into groups with respect to their total illumination output and with respect to the shape of their time-intensity curves.

Each of the lines 74 intersects the concentric shutter factor grid for $\frac{1}{200}$ second at a point which corresponds to the portion of the total quantity of light generated by a flash bulb of the given type that reaches the film within the limited time period of $\frac{1}{200}$ second.

In most instances the shutter factor of $\frac{1}{200}$ second is a limiting factor because most flash bulbs provide illumination for a longer period than $\frac{1}{200}$ second. The fact that $\frac{1}{200}$ second is a limiting factor in most instances is indicated by the non-radial direction of the lines 74 between the $\frac{1}{200}$ second grid and the $\frac{1}{100}$ second grid line as may be seen in Fig. 1. $\frac{1}{100}$ second is also a limiting factor in most instances as indicated by the fact that most of the lines 74 are also non-radial in direction between the $\frac{1}{100}$ second grid line and the $\frac{1}{50}$ second grid line. In some instances the $\frac{1}{50}$ second shutter factor is not limiting, as shown by the fact that the line 74 representing S. M. and S. F. flash bulbs extends inward in a true radial direction from the $\frac{1}{50}$ second grid to the $\frac{1}{25}$ second grid.

As heretofore stated, the scale representing the aperture factor may be placed on either of the two scale members 22 and 23. In this particular embodiment of the invention the aperture scale 76 is on the margin of the front scale member 22 and comprises a plurality of angularly spaced graduations or marks representing different aperture sizes, as best shown in Fig. 7. Here again a geometrical scale is used in which values double over equal distances along the scale. Thus $f22$ which represents twice the aperture area of $f32$ is spaced $22\frac{1}{2}°$ from $f32$, and $f16$, $f11$ et cetera are spaced apart by the same distance.

As heretofore suggested, preferably the frictional contact between the front scale member 22 and the back scale member 23 is sufficient to cause the front scale member 22 to be rotated by the back scale member so that any setting of the front scale member with respect to the back scale member will be maintained during movement of the latter to adjust range finder mechanism. In this particular embodiment of the invention the frictional contact between the two members is provided by a flat ring member 78 of suitable material mounted on the back of the front scale member 22 for frictional contact with the back scale member 23. If desired the aperture scale 76 as well as the tabulation of flash bulb numbers 75 may be printed on the forward face of this annular member, where they will be visible through the transparent scale member 22.

As heretofore stated the reflectivity factor is introduced into the exposure computation by the reference means 21. For example, the reference means 21 may be provided with a central reference mark or index 80 representing subjects of normal reflectivity, a reference mark in the form of a dark dot 81 representing dark subjects or dark surroundings, and a third reference mark in the form of a light dot 82 representing light subjects or light surroundings. The reference marks 80, 81 and 82 are located on the forward face of reference means 21 adjacent the aperture scale 76 on front scale member 22, so that the proper aperture setting may be read with reference to any one of said marks.

The operation of this embodiment of the invention may be readily understood from the foregoing description. In a typical procedure the photographer has in mind the A. S. A. rating for the sensitivity of the film in his camera and he notes the radial grid line 70 corresponding to this value on the two-dimensional polar scale carried by the back scale member 23. He next selects a desired camera shutter speed and notes the intersection of the corresponding concentric grid 71 with the radial grid 70 that represents the speed rating of the film in the camera.

The next step is to select the particular line 74 on the front scale member 22 that corresponds to the selected flash bulb and then to adjust the two discs relative to each other to place the selected line 74 on the front scale member in register with the previously determined intersection of lines on the back scale member 23. The result is that the two scale members are now positionally related to each other in accord with the values of the film factor, the shutter factor and the flash factor. Any limitation of the flash factor by the shutter factor is automatically taken into account.

The photographer standing at a location selected for firing the flash bulb next looks through the sighting window 38 of the range finder mechanism at the subject to be photographed and manually rotates the back scale member 23 which is operatively connected to the movable range finder element 45, until the subject appears as a single image. With this adjustment of the range finder mechanism the distance factor has been introduced and the reference means 21 will indicate the correct aperture setting of the camera on the aperture scale 76 carried by the front scale member 22. If the subject being photographed is not normal or the surroundings are not normal with respect to reflectivity, the corrective reflectivity factor may be introduced by using the dark dot 81 to determine the aperture setting for a dark subject or environment or using the light dot 82 for a light subject or environment.

It is apparent that the operation of the device is quite flexible and that various sequences of steps may be followed. For example, the operator may first move the back scale member to adjust the range finder mechanism in accordance with the distance from the flash bulb to the subject and then may follow with the other adjustments necessary to reach the final determination of the aperture setting.

Fig. 9 illustrates a modification of the invention which consists in a certain reversal with respect to the positioning of the aperture scale. For the most part, however, the structure of the device is the same as heretofore described, corresponding numerals being used to indicate corresponding parts except as noted below.

In Fig. 9 the reference means 87 that corresponds to the reference means 21 of the first described form of the invention is a relatively extensive arcuate member fixedly carried by the range finder housing 20 adjacent the periphery of the two rotary scale members. The two scale members are a front scale member 88 and a rear scale member 89. In this instance the front scale member 88 does not have an aperture scale but does have a central reference mark 90 corresponding to the previously mentioned central reference mark 80 and has two flanking dots 91 and 92 corresponding to the previously mentioned dark dot 81 and light dot 82. The aperture scale is a scale 93 on the reference member 87. There is a further reversal or transposition in that the polar grid scale having radial grid lines 70 for the film sensitivity factor and concentric grid lines 71 for the shutter time factor are on the front scale member 88 instead of the back scale member 89, and the back scale member carries the lines 74 representing the modified flash light factor and the tabulation of flash bulb numbers 75.

In this case, the friction ring 78 between the front and back scale members may if desired be secured to the back scale member 89, and the flash bulb numbers 75 may be printed on the forward face of said ring.

In general the various embodiments of the invention described above are characterized by a basic combination in which a range finder mechanism cooperates with two relatively movable scale members and a reference means to interrelate four factors for computing solutions to exposure problems. In the first described form of the invention shown in Figs. 1 to 8 the flash factor and the aperture factor are both represented by indices on the front scale member. The film factor is represented by indices on the back member and the distance factor is taken into account by the reference means in relation to the movement of the scale members during distance-measuring adjustment of the range finder mechanism. In the second form of the invention shown in Fig. 9 the front scale member takes care of the film factor together with the distance factor, the back scale takes care of the flash factor and the reference means takes care of the aperture factor. Other reversals in relationship may be made in other embodiments of the invention, if desired. To give another example, the front scale member may take care of the film factor together with the aperture factor while the back scale member takes care of the flash factor and the reference means takes care of the distance factor. Various other changes, substitutions and departures may be made from my disclosure within the spirit and scope of the appended claims.

I claim:

1. In a device for use in flash photography to determine correct camera adjustment on the basis of the illumination by the flash light source as limited by the shutter time factor as a first factor, the sensitivity of the film combined with the shutter time factor as a second factor, the relative size of the aperture of the camera lens as a third factor and the distance of the light source from the subject as a fourth factor, the combination of: a range finder mechanism having a fixed element and a second element movable relative thereto to determine the distance to a photographic subject; a first scale means; a second scale means adjacent thereto; means operatively connecting said second scale means to said movable range finder element to move said movable range finder element in response to movement of said second scale means; and a reference means adjacent said first scale means and fixed relative to said fixed range finder element, said first and second scale means being movable relative to each other and relative to said reference means; one of said scale means having indices representing one of the first two mentioned factors, the other of the scale means having indices cooperating with the first-mentioned indices and representing the other of the first two mentioned factors, whereby said two scale means may be positioned relative to each other in accord with the first two mentioned factors; said reference means and said first scale means having cooperating index means including at least one index on one of the two last-mentioned means and indices on the other of said two last-mentioned means representing the third factor; whereby positioning the two scale means relative to each other in accord with the first two factors and positioning the two scale means relative to said reference means by movement of said second scale means to effect distance-measuring adjustment of said movable range finder element in accord with the fourth factor results in cooperation of the index means on said reference means and said first scale means to indicate the correct camera aperture adjustment.

2. A combination as set forth in claim 1 in which said one of said two last-mentioned means has a plurality of reference marks cooperative with the indices representing the third factor on said other of said two last-mentioned means to indicate aperture adjustments for different degrees of reflectivity of photographic subjects.

3. A combination as set forth in claim 1 in which the two first mentioned factors are represented by two dimensional scales and one of said scale means is transparent and overlies the other scale means for visual guidance in the relative positioning of their respective two dimensional scales.

4. A combination as set forth in claim 1 in which said two scale means are coaxial rotary members.

5. In a device for use in flash light photography to determine correct camera adjustments on the basis of the illumination by the light source as modified by the shutter time factor as a first factor, the sensitivity of the film combined with the shutter time factor as a second factor, the relative size of the aperture of the camera lens as a third factor and the distance of the light source from the subject as a fourth factor, the combination of: a range finder mechanism having a fixed element and a second element movable relative to the fixed element to determine the distance to a photographic subject; a back scale means and a front scale means movable relative to each other and relative to the fixed range finder element, said front scale means being substantially transparent and overlying said back scale means; one of said scale means being operatively connected to said movable element of the range finder to move said movable element in response to movement of said one scale means; and a reference means fixed relative to the fixed range finder element adjacent the other of said scale means for cooperation therewith, said front scale means having indices representing one of the first two mentioned factors, the back scale means having indices cooperating with the first-mentioned indices and representing the other of the first two mentioned factors, whereby said two scale means may be positioned relative to each other in accord with the first two mentioned factors; said reference means and said other scale means having cooperating index means including at least one index on one of the two last-mentioned means and indices on the other of said two last-mentioned means representing the third factor; whereby positioning the two scale means relative to each other in accord with the first two factors and positioning the two scale means relative to said reference means by movement of said one scale means to effect distance-measuring adjustment of said movable range finder element in accord with the fourth factor results in cooperation of the index means on said reference means and said other scale means to indicate the correct camera aperture adjustment.

6. A combination as set forth in claim 5 in which said one of said two last-mentioned means has indices cooperative with the indices representing the third factor on said other of said two last-mentioned means to indicate aperture adjustments for different degrees of reflectivity of photographic subjects.

7. A combination as set forth in claim 5 in which each of said first two mentioned factors is represented by a two-dimensional scale and in which the front scale means is transparent with the two-dimensional scale on the front scale means overlying the two-dimensional scale on the back scale means.

8. A combination as set forth in claim 7 in which said two scale means are rotary coaxial members and said two-dimensional scales are polar grid scales.

9. A combination as set forth in claim 8 in which the two-dimensional scale representing the second factor has radial indices representing different degrees of sensitivity of film and concentrically arranged indices representing different periods of exposure of the film.

10. In an exposure calculating device for use in flash photography to determine correct camera adjustment on the basis of the illumination by a flash light source as limited by the shutter time factor as a first factor, the sensitivity of the film combined with the shutter time factor as a second factor, the relative size of the aperture of the camera lens as a third factor and the distance of the light source from the subject as a fourth factor, the combination of: a range finder mechanism having a fixed element and a second element movable relative thereto to determine the distance from the range finder mechanism to a photographic subject; a first rotary disc; a second rotary disc of transparent material overlying the first disc, one of said discs having a two dimensional polar scale for said first factor, the other of said discs having a two dimensional polar scale for said second factor cooperating with the first mentioned polar scale, radial distances on both said scales being in accord with the shutter time factor; one of said discs being operatively connected to said movable element of the range finder mechanism to move said movable element in response to rotary movement of said last-mentioned disc, and the other of said discs having a scale representing said aperture factor; and an index means fixed relative to said fixed element of the range finder mechanism to indicate values on said aperture factor scale in accord with the setting of the two discs relative to each other and the adjustment of said movable element of the range finder mechanism.

References Cited in the file of this patent

UNITED STATES PATENTS

| | | |
|---|---|---|
| 2,060,613 | Dautzenberg | Nov. 10, 1936 |
| 2,213,749 | Strauss | Sept. 3, 1940 |
| 2,296,292 | Miller | Sept. 22, 1942 |
| 2,351,834 | Phillips | June 20, 1944 |
| 2,369,199 | Aiken | Feb. 13, 1945 |
| 2,677,999 | Smith | May 11, 1954 |

OTHER REFERENCES

"Flash Exposure Calculator," Ware, an article in The Camera Magazine, vol. 74, No. 9, September 1951, pages 108, 109 and 114.